United States Patent [19]
Olofsson et al.

[11] Patent Number: 6,167,031
[45] Date of Patent: Dec. 26, 2000

[54] METHOD FOR SELECTING A COMBINATION OF MODULATION AND CHANNEL CODING SCHEMES IN A DIGITAL COMMUNICATION SYSTEM

[75] Inventors: Håkan Gunnar Olofsson, Stockholm, Sweden; Jörn Thielecke, Erlangen, Germany

[73] Assignee: Telefonaktiebolaget LM Ericsson (publ), Stockholm, Sweden

[21] Appl. No.: 08/921,321

[22] Filed: Aug. 29, 1997

[51] Int. Cl.[7] .................................................... H04Q 7/34
[52] U.S. Cl. ......................... 370/252; 370/345; 455/67.3
[58] Field of Search .................................. 370/252, 345; 455/63, 67.3, 226.3, 228, 522

[56] References Cited

U.S. PATENT DOCUMENTS 5,909,469   6/1999   Frodigh et al. ........................ 375/302

FOREIGN PATENT DOCUMENTS

| | | | |
|---|---|---|---|
| 0 137695 A2 | 4/1985 | European Pat. Off. ......... | H04N 1/00 |
| 0 154565 A2 | 9/1995 | European Pat. Off. ........ | H04L 27/00 |
| 0 731573 A1 | 9/1996 | European Pat. Off. ........ | H04B 17/00 |
| WO 93/00751 | 1/1993 | WIPO .............................. | H04B 1/10 |
| WO 97/13388 | 4/1997 | WIPO .............................. | H04Q 7/38 |

OTHER PUBLICATIONS

Sampei, S. et al, 'Adaptive Modulation/TDMA Scheme for Personal Multi–Media Communication Systems', Global Telecommunications Conference, 1994, GLOBECOM'94, Communications: The Global Bridge, IEEE, pp. 989–993, Nov. 1994.

UE, T. et al., 'Symbol Rate and Modulation Level Controlled Adaptive Modulation/TDMA/TDD for Personal Communication Systems', Vehicular Technology Conference, 1995 IEEE 45th, pp. 306–310, Jul. 1995.

Matsuoka, H. et al., 'Adaptive Modulation System with Variable Coding Rate Concatenated Code for High Quality Multi–Media Communication Systems', Vehicular Technology Conference, Apr. 1996, IEEE 46th, pp. 487–491.

Pearce, D.A.J. et al., 'Comparison of Counter–Measures Against Slow Rayleigh Fading for TDMA Systems', Advanced TDMA Techniques and Applications (Digest No. 1996/234), IEE Colloquium, pp. 9/1–9/6, Oct. 1996.

Naijoh, M. et al., 'ARQ Schemes With Adaptive Modulation/TDMA/TDD Systems for Wireless Multimedia Communication Services', Personal, Indoor and Mobile Radio Communications, Sep. 1997, PIMRC'97, 8th IEEE International Symposium, pp. 709–713.

Biglieri, E. et al., 'Coding and Modulation Under Power Constraints', IEEE Personal Communications, pp. 32–39, Jun. 1998.

European Search Report dated May 12, 1998.

J.E. Kleider et al., "An Adaptive–Rate Digital Communication System for Speech", 1997 IEEE International Conference on Acoustics, Speech and Signal Processing, vol. 3, Apr. 21–24, 1997, Los Alamitos, CA.

*Primary Examiner*—Melvin Marcelo
*Attorney, Agent, or Firm*—Burns, Doane, Swecker & Mathis, L.L.P.

[57] ABSTRACT

A communication system that supports multiple modulation and channel coding schemes selects an optimum RF link by measuring link quality parameters, such as C/I ratio. All of the available RF links are characterized based on the measured link quality parameters by calculating mean values and variances of the parameters. Based on the characterization of the RF link, user quality values, such as user data throughput and speech quality values, are estimated. The communication system selects the RF link that provides the best user quality value.

41 Claims, 10 Drawing Sheets

METHOD FOR SELECTING A COMBINATION OF MODULATION AND CHANNEL CODING SCHEMES IN A DIGITAL COMMUNICATION SYSTEM

BACKGROUND

This invention generally relates to the field of communication systems and, more particularly, to digital communication systems that supports multiple modulation and channel coding schemes.

In wireless digital communication systems, standardized air interfaces specify most of system parameters, including modulation scheme, channel coding scheme, burst format, communication protocol, symbol rate, etc. For example, European Telecommunication Standard Institute (ETSI) has specified a Global System for Mobile Communication (GSM) standard that uses time division multiple access (TDMA) to communicate control, voice and data information over radio frequency (RF) physical channels or links using Gaussian Minimum Shift Keying (GMSK) modulation scheme at a symbol rate of 271 ksps. In the U.S., Telecommunication Industry Association (TIA) has published a number of Interim Standards, such as IS-54 and IS-136, that define various versions of digital advanced mobile phone service (D-AMPS), a TDMA system that uses a Differential QPSK (DQPSK) modulation scheme for communicating data over RF links.

Digital communication systems use a variety of linear and non-linear modulation schemes to communicate voice or data information in bursts. These modulation schemes include, GMSK, Quadrature Phase Shift Keying (QPSK), Quadrature Amplitude Modulation (QAM), etc. GMSK modulation scheme is a non-linear low level modulation (LLM) scheme with a symbol rate that supports a specified user bit rate. In order to increase user bit rate, high-level modulation (HLM) schemes can be used. Linear modulation schemes, such as QAM scheme, may have different level of modulation. For example, 16QAM scheme is used to represent the sixteen variations of 4 bits of data. On the other hand, a QPSK modulation scheme is used to represent the four variations of 2 bits of data.

In addition to various modulation schemes, digital communication systems can support various channel coding schemes, which are used to increase communication reliability. For example, General Packet Radio Service (GPRS), which is a GSM extension for providing packet data service, supports four channel coding schemes. A Convolutional Half-Rate Code scheme, CS1 coding scheme, which is the "mother" channel coding scheme of GPRS. The CS1 scheme is punctured to obtain approximately two-third rate and three-fourth rate code schemes, CS2 and CS3 coding schemes. GPRS also supports an uncoded scheme, known as CS4 coding scheme.

Generally, channel coding schemes code and interleave data bits of a burst or a sequence of bursts to prevent their loss under degraded RF link conditions, for example, when RF links are exposed to fading. The number of coding bits used for channel coding of data bits corresponds to error detection accuracy, with higher number of coding bits providing higher bit error detection accuracy. For a given gross bit rate, a high number of coding bits, however, reduces user bit rate, since coding bits reduce the number of user data bits that can be transmitted in a burst.

The communication channel typically introduces errors in sequence. In order to improve coding efficiency, the coded bits are interleaved, before transmission. The purpose of interleaving is to distribute the errors over several code words. The term perfect interleaving is used when the sequence of the received data bit errors are uncorrelated. The more less uncorrelated the received data bits are at the receiver, the easier it is to recover lost data bits. On the other hand, if interleaving is not effective, large portions or blocks of transmitted data bits may be lost under degraded RF link conditions. Consequently, error correction algorithms may not be able to recover the lost data.

TDMA systems subdivide the available frequency band into one or several RF channels. The RF channels are divided into a number of physical channels corresponding to time slots in TDMA frames. Logical channels are mapped onto one or more physical channels, where modulation and channel coding schemes are specified. An RF link includes one or more physical channels that support the logical channels. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. Although digital techniques gain more useful channels from a given frequency spectrum, there still remains a need to reduce interference, or more specifically to increase the ratio of the carrier signal strength to interference, (i.e., carrier-to-interference (C/I)) ratio. RF links that can handle lower C/I ratios are considered to be more robust than those that only can handle higher C/I ratios.

Depending on the modulation and channel coding schemes, grade of service deteriorates more rapidly as link quality decreases. In other words, the data throughput or grade of service of more robust RF links deteriorates less rapidly than those of less robust RF links. Higher level modulation schemes are more susceptible to link quality degradation than lower level modulation schemes. If a HLM scheme is used, the data throughput drops very rapidly with a drop in link quality. On the other hand, if a LLM scheme is used, data throughput and grade of service does not deteriorate as rapidly under the same interference conditions.

Therefore, link adaptation methods, which provide the ability to dynamically change modulation scheme, channel coding, and/or the number of used time slots, based on channel conditions, are used to balance the user bit rate against link quality. Generally, these methods dynamically adapt a system's combination of channel coding, modulation, and number of assignable time slots to achieve optimum performance over a broad range of C/I conditions.

One evolutionary path for next generation of cellular systems is to use high-level modulation (HLM), e.g., 16QAM modulation scheme, to provide increased user bit rates compared to the existing standards. These cellular systems include enhanced GSM systems with GPRS extension, enhanced D-AMPS systems, International Mobile Telecommunication 2000 (IMT-2000), etc. A high level linear modulation, such as 16QAM modulation scheme, has the potential to be more spectrum efficient than, for example, GMSK, which is a low-level modulation (LLM) scheme. Because higher level modulation schemes require a higher minimum C/I ratio for acceptable performance, their availability in the system becomes limited to certain coverage areas of the system or certain parts of the cells, where more robust links can be maintained.

In order to provide various communication services, a corresponding minimum user bit rate is required. In voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation scheme, and for a TDMA system, the number of assignable time slots per call.

Data services include transparent services and non-transparent services. Transparent services, which have a minimum link quality requirement, provide target user bit rates. A system that provides transparent communication services varies the gross bit rate to maintain a constant user bit rate with the required quality. Conversely, in non-transparent services, for example, GPRS, the user bit rate may vary, because erroneously received data bits are retransmitted. Unlike non-transparent services, transparent services do not retransmit erroneously received data bits. Therefore, transparent services have a constant point-to-point transmission delay, and non-transparent services have a non-constant point-to-point transmission delay.

A communication system may provide a data service through a number of RF links supporting different combinations of channel coding, speech coding, and/or modulation schemes. For example, the system may provide a multimedia service using two or more separate RF links that separately provide audio and video signals. Under this scenario, one of the two RF links may use HLM scheme and the other link may use LLM scheme. In order to provide a constant user bit rate in a TDMA system, lower level modulation schemes may use a higher number of time slots than higher level modulation schemes.

Moreover, digital communication systems must also select a suitable combination of channel coding and modulation schemes based on link quality. For example, for a high quality link, higher level modulation or less channel coding results in higher user bit rate, which may be used advantageously by different communication services. For example, in a non-transparent data service, user data throughput is increased. For a speech service, the increased user bit rate may be used for deploying an alternative speech coder with higher quality. Therefore, a system that supports multiple modulation and channel coding schemes should provide sufficient flexibility for selecting an optimum combination of modulation and channel coding schemes.

Conventional method for selecting an optimum combination of modulation and channel coding schemes assume that the link quality parameters are perfectly known at a given instant. Usually, these methods determine link quality parameters by measuring, at predefined instances, one or more of received signal strength (RSS) or bit error rate (BER), etc. Using these instantaneous measurements, these methods also assume that user quality as a function of link quality parameters is perfectly known for all combinations of modulation and channel coding schemes.

Because these parameters vary continuously, the mean measurement of link quality parameters do not give an accurate indication of user quality, especially after a link with a different combination of modulation and channel coding schemes is selected. One method dynamically adapts user bit rate of a TDMA system to achieve optimum voice quality over a broad range of channel conditions. This system continuously monitors link quality by making instantaneous measurements of a RF link's C/I ratio. The system dynamically adapts its combination of modulation and channel coding schemes and the number of assignable time slots to optimize voice quality for the measured conditions. In addition, the system determines cost functions to derive at a cost of using RF links with different modulation and coding schemes to improve voice quality.

Figure 1:
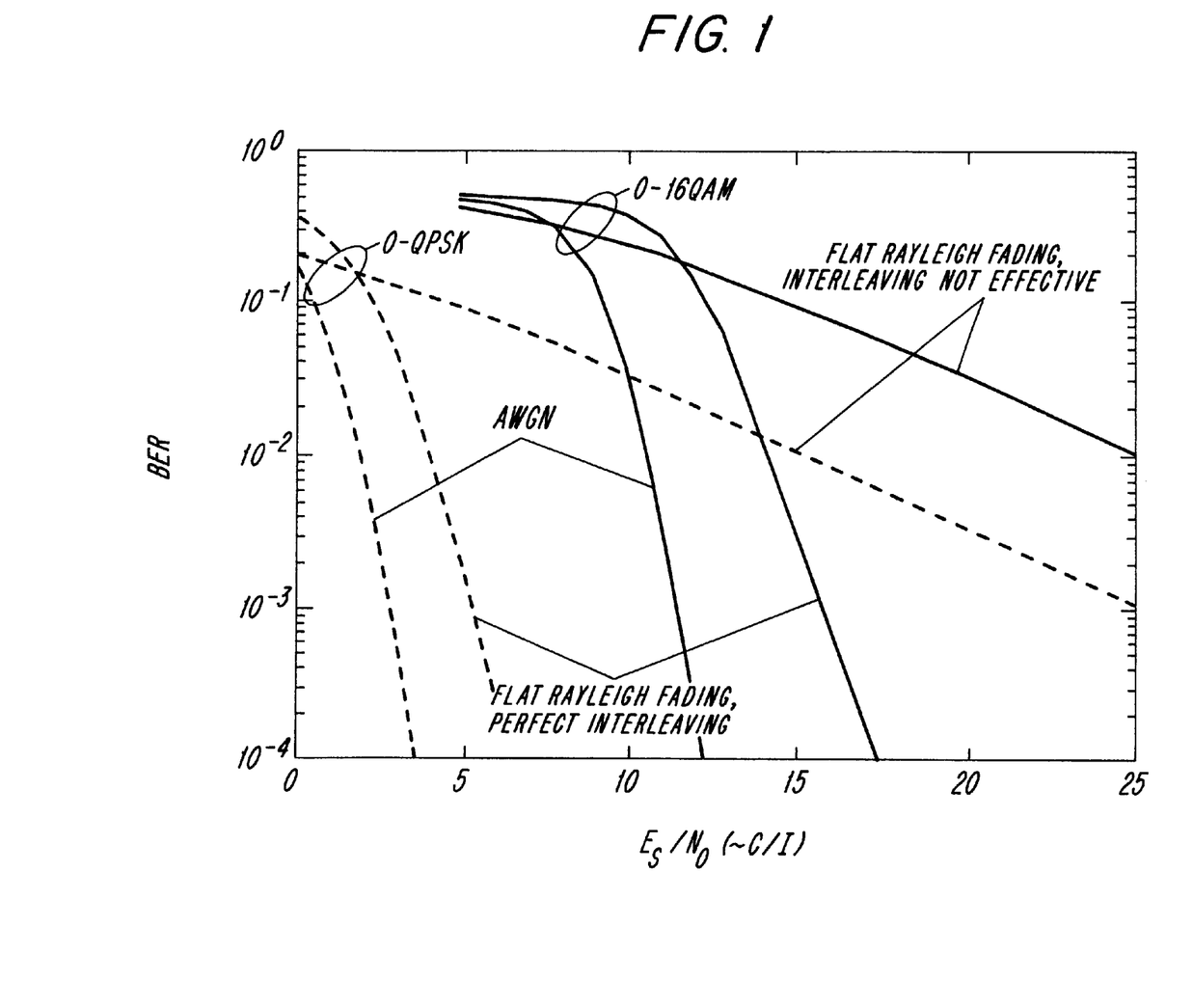
FIG. 1 is a diagram of the performance of two variously modulated RF links under three different channel conditions.

User quality, however, varies considerably with variations in link quality parameters. FIG. 1 shows link performance of two modulation schemes, i.e., QPSK and 16QAM schemes, which are exposed to three channel conditions: an Average White Gaussian Noise (AWGN) channel condition, a fast Rayleigh Fading channel condition, and a slow Rayleigh fading channel condition. In FIG. 1, link performance is expressed in terms of BER. For a given C/I ratio, the AWGN channel provides the best performance, due to the lack of fading dips. In fast Rayleigh fading channel, where fading varies fast enough to make effective use of interleaving, link performance is degraded compared to the AWGN channel. In slow Rayleigh fading channel, where fading varies slowly such that interleaving is not effective, the worst link performance is obtained. Conventional methods use mean C/I ratio to determine the channel condition. As shown in FIG. 1, however, mean C/I ratio for different channel conditions may be the same, when link performance under different combination of modulation and channel coding schemes may be quiet different. Therefore, more information is needed to accurately estimate link performance, if different combinations of modulation and channel coding is used.

An additional factor affecting user quality is time dispersion. Receiver equalizers can not effectively handle large time dispersions. As a result, link performance degrades, even when C/I ratio distribution remains the same. Accordingly, mean measurements of C/I ratio, BER or time dispersion alone are not sufficient for estimating performance of a selected link. Therefore, there exists a need for an effective link selection method in systems that support various modulation and channel coding schemes.

SUMMARY

The present invention that addresses this need is exemplified in a selection method that statistically characterizes combinations of available modulation and channel coding schemes using measured link quality parameters to determine which combination provides the best user quality. The method of the invention measures at least one link quality parameter of at least one RF link, for example, C/I ratio, BER, received signal strength, or time dispersion. Then, at least one channel characteristic measure is calculated based on the measured link quality parameter by computing both its mean value and variance. By introducing the variance of for example C/I ratio, it is possible to estimate the type of channel conditions a transmission is susceptible to. Consequently, it is possible to estimate how a change of modulation and/or channel coding scheme would effect the link quality. In an exemplary embodiment, the channel characteristic measure may be calculated for each one of available combinations of modulation and channel coding schemes of an RF link. Thereafter, a user quality estimator estimates user quality values, for example, user data throughput or speech quality values, based on the calculated channel characteristic measure. Finally, the present invention selects a combination of modulation and channel coding schemes on an RF link that provides the best user quality.

According to some of its more detailed features, the present invention maps the calculated channel characteristic measure with estimated user quality values of the supported combinations of modulation and channel coding schemes. The mapping function may use simulation results, laboratory results, or results derived during normal operation of a communication system.

According to another aspect of the invention, the selection method determines an optimal transmit power for each combination of modulation and channel coding schemes based on the measured link quality parameter. Thereafter, the user quality values are estimated based on the optimal transmit power. Also, data bursts are transmitted on the selected RF link at the optimal transmit power.

Other features and advantages of the present invention will become apparent from the following description of the preferred embodiment, taken in conjunction with the accompanying drawings, which illustrate, by way of example, the principles of the invention.

DETAILED DESCRIPTION

Figure 2:
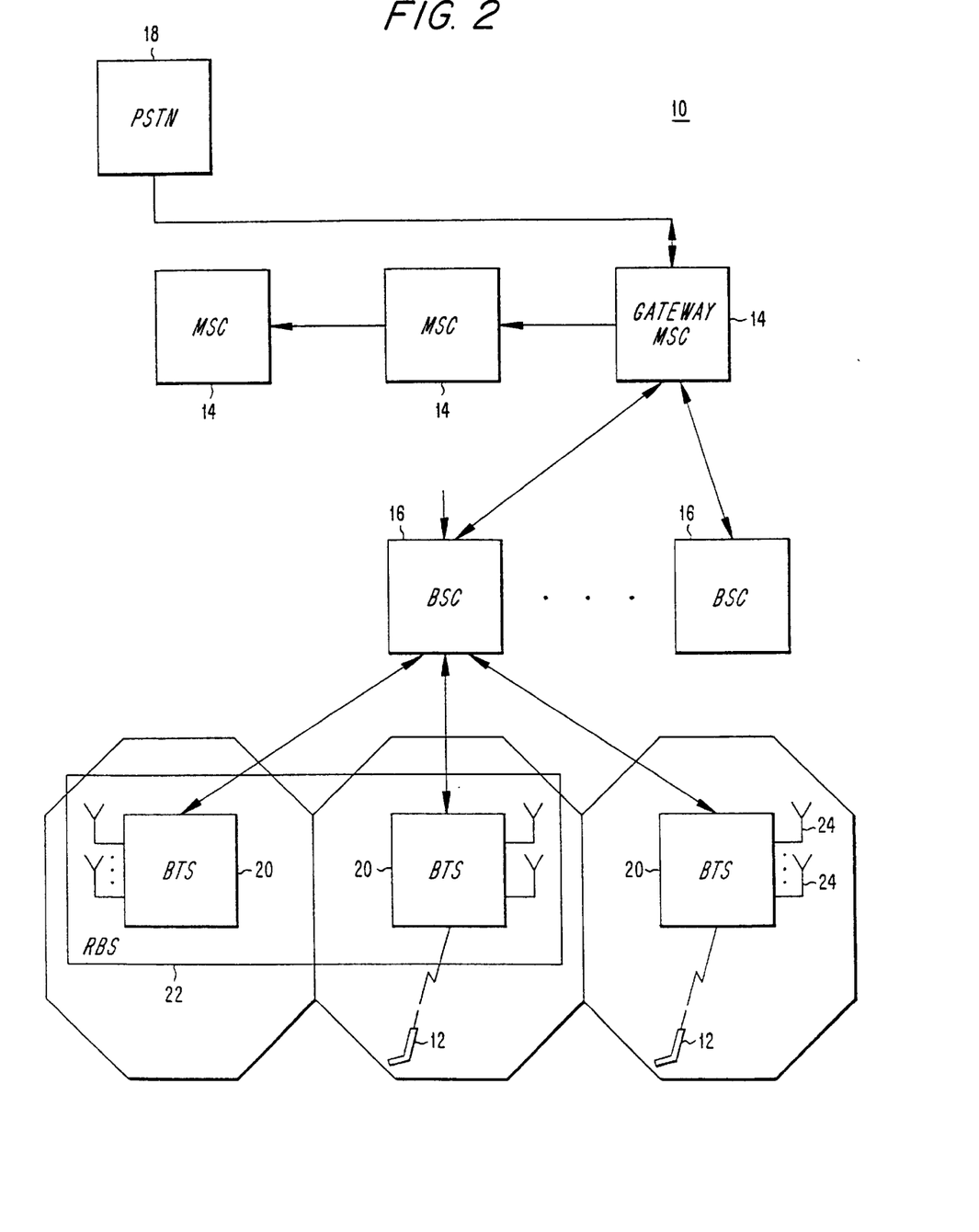
FIG. 2 is a block diagram of a communication system which advantageously uses the present invention.

Referring to FIG. 2, a communication system 10 according to an exemplary embodiment of the present invention supports multiple modulation schemes. In an exemplary embodiment of the invention, the system 10 supports three modulation schemes: a first LLM (LLM1) scheme, a second LLM (LLM2) scheme, and a HLM scheme. LLM1 scheme is a non-linear modulation scheme, such as GMSK modulation scheme used in GSM systems. LLM2 scheme is a linear modulation scheme, such as QPSK. Finally, HLM scheme is a higher level linear modulation schemes, for example, 16QAM scheme, that could be supported by the second generation of enhanced GSM systems, which as of yet are not standardized.

The communication system 10 also supports the channel coding schemes of GSM's GPRS extension. The system 10, therefore, supports CS1, CS2, CS3, and CS4 channel coding schemes. The system 10 supports various combinations of modulation and channel coding schemes on a plurality of RF links. Although, the system 10 is described with reference to the above specified exemplary modulation and channel coding schemes, it should be noted that a wide range of modulation and coding schemes may be used to implement the present invention.

The mode of operation of GSM communication systems is described in European Telecommunication Standard Institute (ETSI) documents ETS 300 573, ETS 300 574 and ETS 300 578, which are hereby incorporated by reference. Therefore, the operation of the GSM system is described to the extent necessary for understanding of the present invention. Although, the present invention is described as embodied in a GSM system, those skilled in the art would appreciate that the present invention could be used in a wide variety of other digital communication systems, such as those based on PDC or D-AMPS standards and enhancements thereof. The present invention may also be used in CDMA or a hybrid of CDMA and TDMA communication systems.

The communication system 10 covers a geographical area that is subdivided into communication cells, which together provide communication coverage to a service area, for example, an entire city. Preferably, the communication cells are patterned according to a cell pattern that allows some of the spaced apart cells to use the same uplink and downlink RF channels. In this way, the cell pattern of the system 10 reduces the number of RF channels needed to cover the service area. The system 10 may also employ frequency hopping techniques, for example, to avoid "deadspots."

Initial selection of modulation scheme would preferably depend on either measured or predicted link quality parameters of a new RF link. Alternatively, the initial selection may be based on a predefined cell parameter. Due to a possible difference in link robustness for LLM1, LLM2, and HLM schemes, a mobile station 12 continues to use LLM1 scheme until the channel characteristic allows the use of other schemes, in which case a link adaptation procedure is initiated to switch modulation scheme from LLM1 scheme to LLM2, or HLM scheme.

When no information is transferred to or from a mobile station 12, for example, during idle states or wait states of GPRS, the mobile station 12 preferably measures link quality parameters of different RF links. For instance, the mobile station 12 measures the interference on RF links that are candidates for use in the future as well as the received signal strength of its current link. The measurement results are used to determine a distribution of channel characteristic measures. These measurements serve as the basis for deciding which combination of modulation and channel coding schemes to use subsequently.

According to the present invention, during an ongoing communication, user quality values are estimated based on channel characteristics, which are expressed in terms of variations and mean values of link quality parameters. The channel characteristics are derived based on measurements of link quality parameters over a predefined period. In this way, the system 10 estimates user quality values provided by available combinations of modulation and channel coding schemes of one or more RF links. By comparing the estimated user quality values of these combinations, the present invention selects a modulation and channel coding combination on an RF link that provides the best user quality value.

For example, for providing a non-transparent service, the system 10 estimates user quality values of available combinations of modulation and channel coding schemes on the one or more RF links in terms of data throughput S. For a predefined time period, the system 10 continuously measures link quality parameters and calculates their mean values and variances. The present invention relies on statistical measures to characterize an RF link. Although the exemplary embodiment uses mean values and variances, other statistical measures may also be used, for example, standard deviation, median, etc. The system 10 calculates the mean values of such link quality parameters as C/I ratio or BER values that are obtained over the predefined time period. Based on measured link quality parameters over the predefined time period, the system 10 also determines the variances of one or more of the link quality parameters. Based on the variances, the system 10 estimates the data throughputs S for all combinations of modulation and channel coding schemes over one or more RF links. The system then selects a new combination of modulation and channel coding schemes on a RF link, if switching to the new combination on that RF link provides a higher data throughput S than that provided by a current combination.

For a speech service, the system 10 may use a different user quality value measure than the data throughput S used for a non-transparent data service. Preferably, the user quality value in speech service is expressed in terms of a voice quality value Q, which may be based on estimated frame erasure rate (FER) and/or residual user bit error rate (RBER) originated from the use of various speech coding schemes. Under this arrangement, the present invention estimates voice quality values Q for different combinations of modulation and channel coding schemes. Then, the system 10 selects a combination that provides the best estimated voice quality value.

The system 10 is designed as a hierarchical network with multiple levels for managing calls. Using an allocated set of uplink and downlink RF links a number of mobile stations 12 operating within the system 10 participate in calls using allocated time slots. At a high hierarchical level, a group of Mobile Service Switching Centers (MSCs) 14 are responsible for the routing of calls from an originator to a destination. In particular, they are responsible for setup, control and termination of calls. One of the MSCs 14, known as the gateway MSC, handles communication with a Public Switched Telephone Network (PSTN) 18, or other public and private networks.

Different operators support different communication standards with different modulation and channel coding schemes. The same operator may also support different modulation and channel coding schemes in different cells. For example, one operator may support LLM1 modulation scheme and CS4 channel coding scheme only, whereas, another operator may support all of the modulation and channel coding schemes. The communication system 10 uses the present invention to select a combination of modulation and channel coding schemes that provide the best user quality value.

At a lower hierarchical level, each one of the MSCs 14 are connected to a group of base station controllers (BSCs) 16. The primary function of a BSC 16 is radio resource management. For example, based on reported received signal strength at the mobile stations 12, the BSC 16 determines whether to initiate a hand over. Under the GSM standard, the BSC 16 communicates with a MSC 14 under a standard interface known as the A-interface, which is based on the Mobile Application Part of CCITT Signaling System No. 7.

At a still lower hierarchical level each one of the BSCs 16 controls, a group of base transceiver stations (BTSs) 20. Each BTS 20 includes a number of TRXs that use the uplink and downlink RF channels to serve a particular common geographical area. The BTSs 20 primarily provide the RF links for the transmission and reception of data bursts to and from the mobile stations 12 within their designated cell. In an exemplary embodiment, a number of BTSs 20 are incorporated into a radio base station (RES) 22. The RBS 22 may be configured according to a family of RBS-2000 products, which is offered by Ericsson, the assignee of the present invention.

Figure 3:
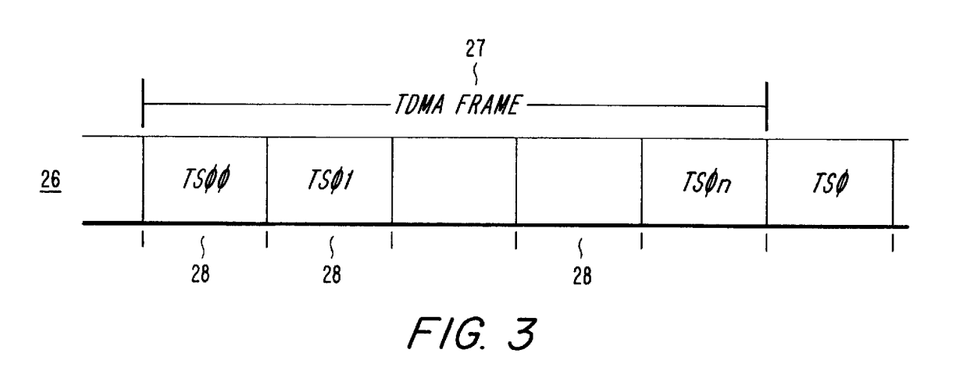
FIG. 3 is a diagram of a subdivided RF channel that is used in the communication system of FIG. 2.

With reference to FIG. 3, an RF channel 26 (uplink or downlink) is divided into repetitive time frames 27 during which information are communicated. Each frame 27 is further divided into time slots 28 that carry packets of information. Speech or data is transmitted during time slots designated as traffic channels ($TCH_1$, . . . , $TCH_n$). All signaling functions pertaining to call management in the system, including initiations, hand overs, and termination are handled via control information transmitted over control channels.

The mobile stations 12 use slow associated control channels (SACCHs) to transmit associated control signals, such as an RX-LEV signal, which corresponds to the received signal strength at the mobile station and RX-QUAL signal, which is a measure of various levels of bit error rate at the mobile station 12, as defined by the GSM standard. Fast associated control channels (FACCHs) perform control functions, such as hand-overs, by stealing time slots allocated for TCHs.

The BSC 16 instructs the RBS 22 based on measures of channel characteristics of RF links between mobile stations 12 to the RBS 22. As described later in detail, the channel characteristics may be measured based on a number of parameters, including received signal strength, bit error rate, the multipath propagation property of the uplink RF channel, for example, time dispersion, or a combination of them.

The system 10 carries out the transmission of information during a time slot in a burst that contain a predefined number of coded bits. The GSM specification defines various types of bursts: normal burst (NB), frequency correction burst (FB), synchronization burst (SB), access burst (AB), and dummy burst. The normal burst, which has a duration of 576 $\mu s$, is used both during the traffic and some control signalling channels. The remaining bursts are primarily used for access and maintaining signal and frequency synchronization within the system.

Figure 4:
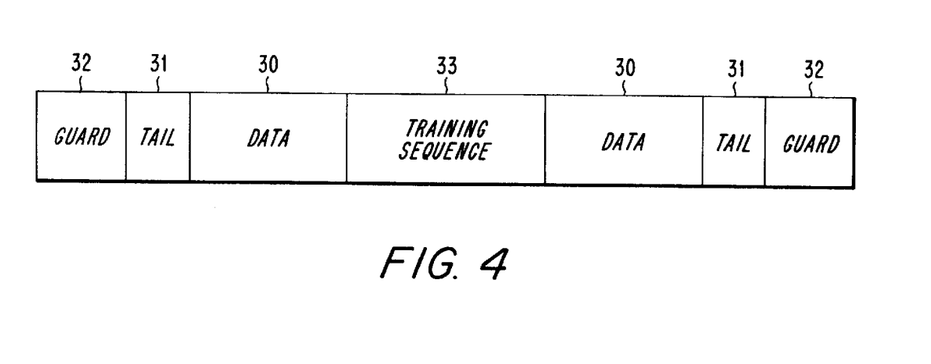
FIG. 4 is a diagram of a normal transmission burst transmitted on the RF channel of FIG. 3.

As shown in FIG. 4, a normal burst 29 includes two separate data portions 30 during which digital data bits are communicated. The normal burst also includes tail and guard sections 31 and 32 as shown. Among other things, the guard section 32 is used to allow for up-ramping of the burst and for down-ramping of the bursts. The tail section 31 is used for demodulation purposes. All burst transmissions, except dummy burst transmissions, include training sequences. The training sequences are patterned with predefined autocorrelation characteristics. During demodulation process, the auto correlation characteristic of the training sequence helps in the synchronization of the received bit sequences over an RF channel. In the normal burst 29, a training sequence 33 is positioned in the middle of the burst between its data portions.

In order to compensate for propagation delays over RF links, the communication system 10 uses a time alignment process by which the mobile stations 12 align their burst transmissions to arrive at the BTSs 20 in proper time relationship relative to other bursts transmissions. As described later, the mobile station 12 and the RBS 22 incorporate equalizers, which correlate received baseband bit sequences over the uplink or downlink RF channels with the training sequences, to provide correlator responses that correspond to the properties of multipath propagation. Based on the correlator responses, the receiver section of the BTS 20 generates a timing advance (TA) parameter. The mobile station 12 uses the TA parameter, which is transmitted from the RBS 22, for advancing or retarding its burst transmissions relative to a time reference.

Figure 5:
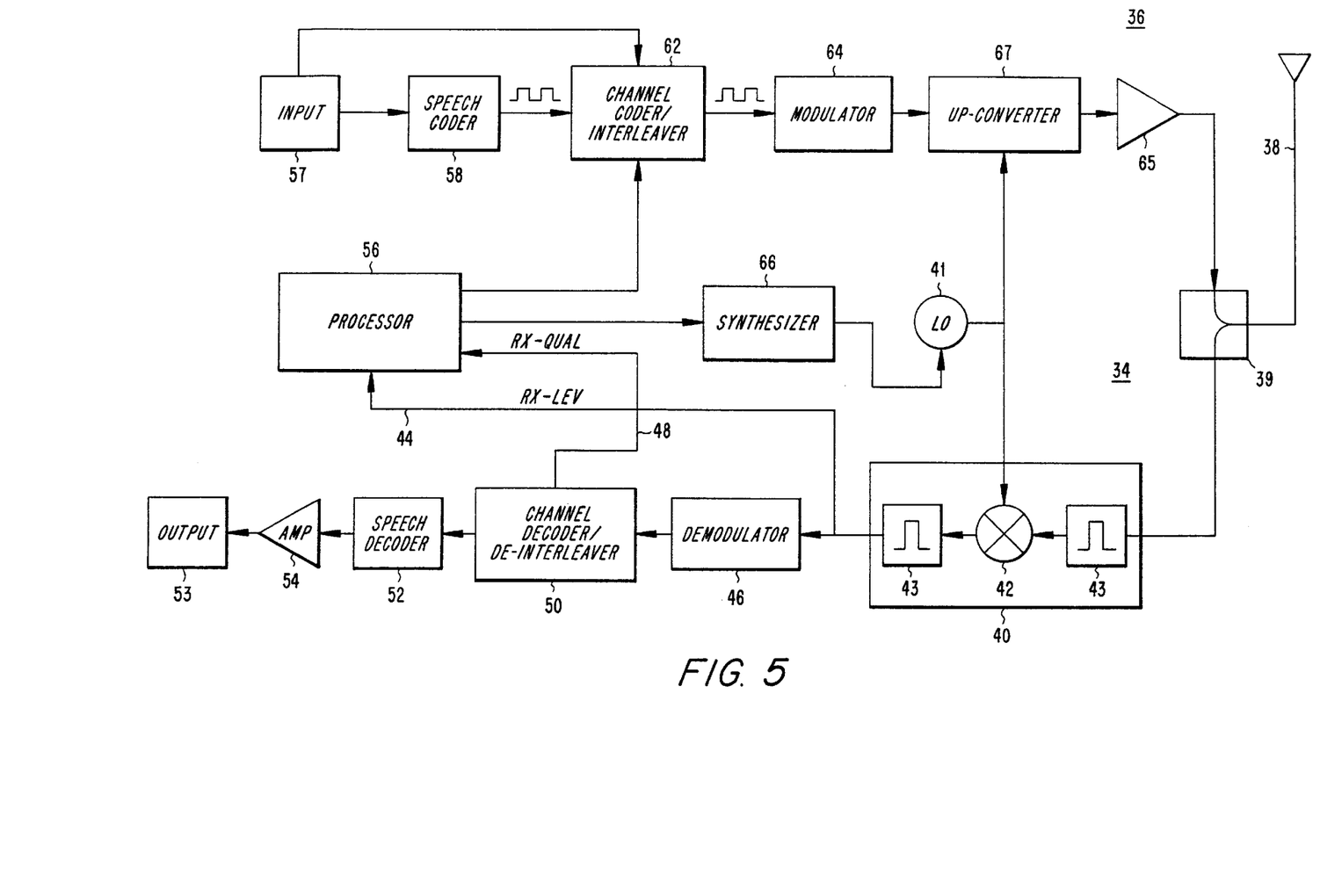
FIG. 5 is a block diagram of a mobile unit used in the communication system of FIG. 2.

With reference to FIG. 5, the block diagram of a mobile station 12 is shown. The mobile station 12 includes a receiver section 34 and a transmitter section 36, which are coupled to an antenna 38 through a duplexer 39. The antenna 38 is used for receiving and transmitting RF signals to and from the BTS 20 over allocated uplink and downlink RF channels. The receiver section 34 includes an RF receiver 40, which includes a local oscillator 41, a mixer 42, and selectivity filters 43 arranged in a well known manner, for down-converting and demodulating received signals to a baseband level. The RF receiver 40, which is tuned by the local oscillator 41 to the downlink channel, also provides an RX-LEV signal on line 44 that corresponds to the received signal strength at the mobile station 12.

The RF receiver provides a baseband signal to a demodulator 46 that demodulates coded data bits representing the received speech, data and signaling information. Depending on the type of mobile station 12, the demodulator 46 can support one or more demodulation schemes corresponding to LLM1, LLM2, and HLM schemes. For example, the demodulator of a mobile station 12 subscribed to an operator that supports LLM1 scheme may be capable of demodulating LLM1 modulated signals only. On the other hand, the demodulator of a mobile station 12 subscribed to an operator that supports all of the three modulation schemes is preferably capable of demodulating LLM1, LLM2, and HLM schemes.

As described above, the demodulator 46 includes an equalizer (not shown) that processes the coded bit pattern disposed on the training sequences, to provide correlator response that are used for predictive demodulation of the baseband signal. The equalizer uses the correlator responses to determine the most probable bit sequence for demodulation. As defined by the GSM specification, a channel decoder/de-interleaver 50 also provides an RX-QUAL signal on line 48, which is a measure of various levels of bit error rate at the mobile station 12. The mobile station 12 reports the RX-QUAL signal and the RX-LEV signal to the BSC 16 on a SACCH channel.

The channel decoder/de-interleaver 50 decodes and de-interleaves the demodulated signal. The channel decoder/de-interleaver 50 may use a wide variety of channel decoding schemes, including CS1–CS4 decoding schemes. The speech data bits are applied to a speech decoder 52 that decodes the speech pattern using one of a variety of supported speech decoding schemes. After decoding, the speech decoder 52 applies an analog speech signal to a output device 53, e.g., a speaker, via an audio amplifier 54. The channel decoder 50 provides the decoded data and signalling information to a microprocessor 56 for further processing, for example, displaying the data to a user.

The transmitter section 36 includes an input device 57, e.g., a microphone and/or keypad, for inputting voice or data information. According to a specified speech/data coding techniques, a speech coder 58 digitizes and codes the voice signals according to a variety of supported speech coding schemes. A channel coder/interleaver 62 codes the uplink data according to a specified coding/interleaving algorithms, including CS1–CS4 coding schemes. The channel coder/interleaver 62 provides an uplink baseband signal to a modulator 64. The modulator 64 modulates the uplink baseband signal according to one or more of supported modulation schemes. Similar to the demodulator 46, the modulator 64 of the mobile station 12 may support one or more of LLM1, LLM2, and HLM schemes.

The modulator 64 applies the coded signal to an up-converter 67, which receives a carrier signal from the up-converted signal local oscillator 41. An RF amplifier 65 amplifies the up-converted signal for transmission trough the antenna 38. A well known frequency synthesizer 66, under the control of the microprocessor 56, supplies the operating frequency information to the local oscillator 41. The microprocessor 56 causes the mobile station 12 to transmit the RX-QUAL and RX-LEV parameters to the RBS 22 over the SACCH.

Figure 6:
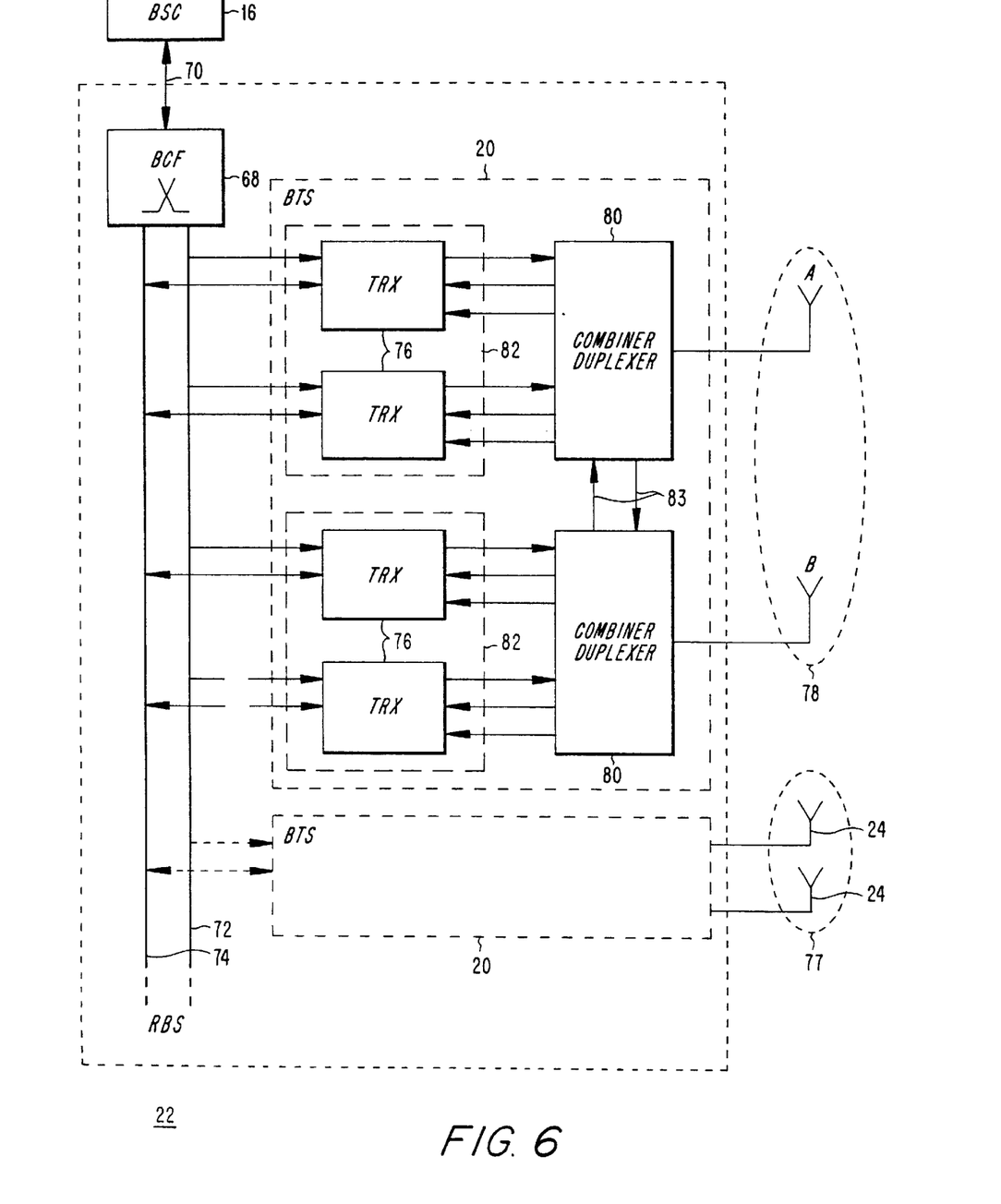
FIG. 6 is a block diagram of a radio base station used in the communication system of FIG. 2.

Referring to FIG. 6, an exemplary block diagram of the RBS 22 is shown to include a plurality of BTSs 20 that serve different geographical areas. Through a timing bus 72, the BTSs 20 are synchronized with each other. Voice and data information are provided to and from the RBS 22 through a traffic bus 74 that may be coupled, through the A-bis interface, to a public or private voice and data transmission line, such as a Ti line (not shown). Each 2TS includes TRXs 75 and 76 that communicate with the mobile station 12. As shown, two antennas designated as 24A and 24B are spaced accordingly to cover cells 77 and 78. The TRXs 76 are coupled to the antennas 24 through combiner/duplexers 80 that combine downlink transmission signals from the TRXs 76 and distribute the uplink received signals from the mobile station 12. The RBS 22 also includes a base station common function (BCF) block 68 that controls the operation and maintenance of the RBS 22.

Figure 7:
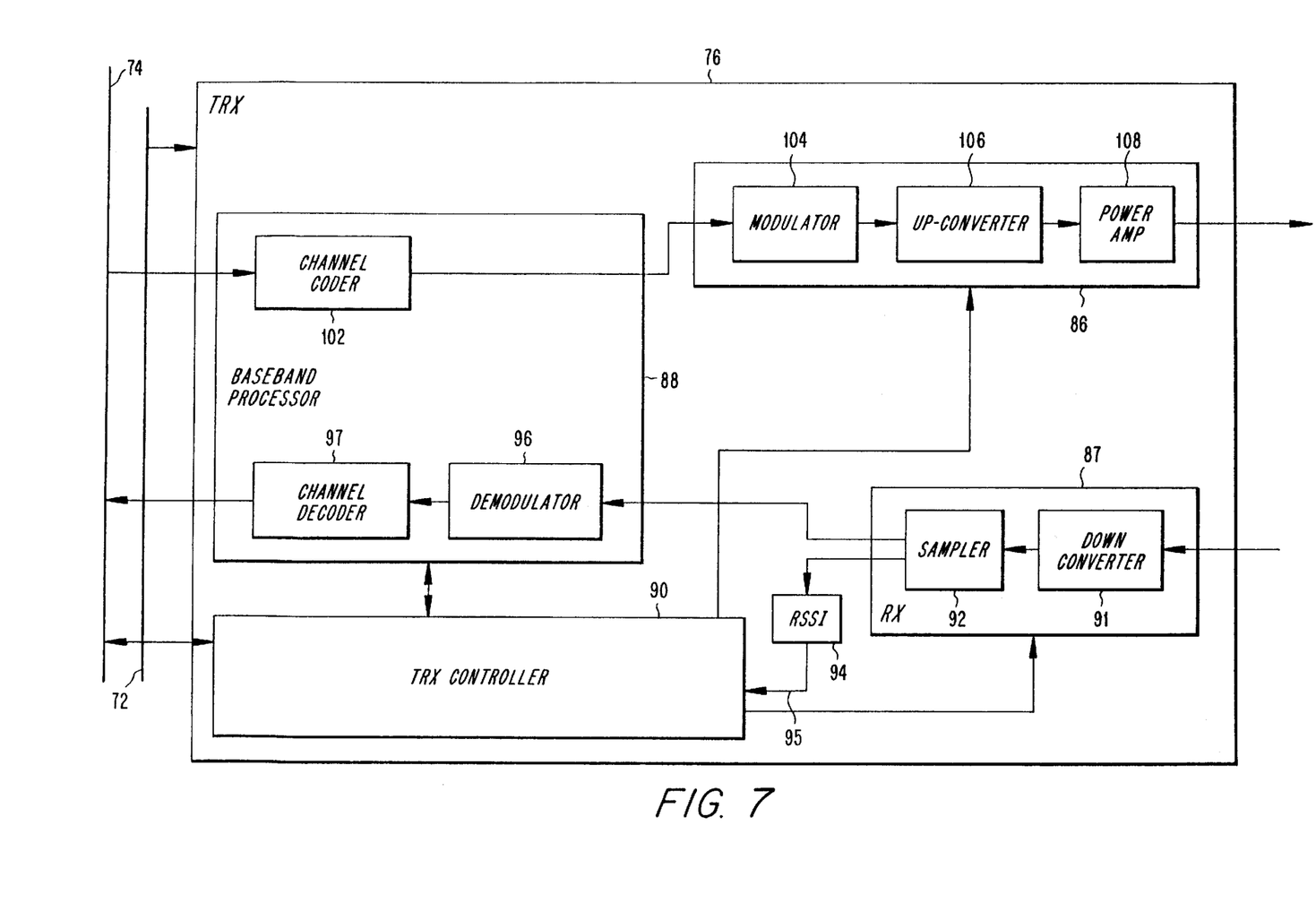
FIG. 7 is a block diagram of a radio transceiver used in the base station of FIG. 6.

Referring to FIG. 7, a block diagram of a TRX 76 is shown. The TRX 76 includes a transmitter section 86, a receiver section 87, a baseband processor 88 and a TRX controller 90. Through a corresponding antenna 24 (shown in FIG. 6), the receiver section 87 receives uplink signals from the mobile station 12. A down-conversion block 91 down-converts the received signal. After down-converting the received signals, the receiver section 87 samples its phase and magnitude, via a sampler block 92, to provide received bit sequence to the baseband processor 88. An RSSI estimator 94 provides an RSSI signal on line 95, which is a measure of the received signal strength. The RSSI estimator 94 may also measure noise disturbance levels during idle channels. The TRX controller 90, which is coupled to the traffic bus 74, processes the commands received from the BSC 16 and transmits TRX related information, such as various TRX measurements, to the BSC 16. Under this arrangement, the TRX 76 periodically reports the RSSI signal and noise disturbance levels to the BSC 16.

The baseband processor 88 includes a demodulator 96 that receives uplink baseband data from the receiver section 87. The demodulator 96 generates correlator responses that are processed in a well known manner to retrieve the uplink baseband data. Similar to the mobile station 12, the demodulator may support demodulation of signals that are modulated using one or more of LLM1, LLM2 or HLM schemes. The uplink baseband data is applied to a channel decoder 97 that decodes the baseband signal according to one or more supported channel decoding scheme, including CS1–CS4 decoding schemes. The channel decoder 97 places the decoded baseband signal on the traffic bus 78, for further processing by the BSC 16.

When transmitting downlink baseband data, the baseband processor 88 receives properly coded data or digitized speech information from the BSC 16 over the traffic bus 74 and applies them to a channel coder 102 that codes and inter-leaves speech and data according to one or more of supported channel coding schemes, including CS1–CS4 channel coding schemes. The transmitter section includes a modulator 104 that modulates the supplied data bits according to one or more of LLM1, LLM2, and HLM schemes. The modulator 104 provides downlink baseband signals to an up-conversion block 106 for up-conversion. A power amplifier 108 amplifies the up-converted signal for transmission through a corresponding antenna.

The system 10, for example, uses one or a combination of the RX-QUAL, RX-LEV, or time dispersion parameters, which are measures of link quality parameters of an RF link, to select an optimum combination of modulation and channel coding on an RF link. The system 10 also uses these parameters to decide whether a link adaptation procedure should be initiated or not. The BSC 16 compares the channel characteristic parameter to corresponding thresholds to determine whether to initiate a link adaptation procedure within coverage areas that support LLM1, LLM2, and HLM schemes.

Figure 8:
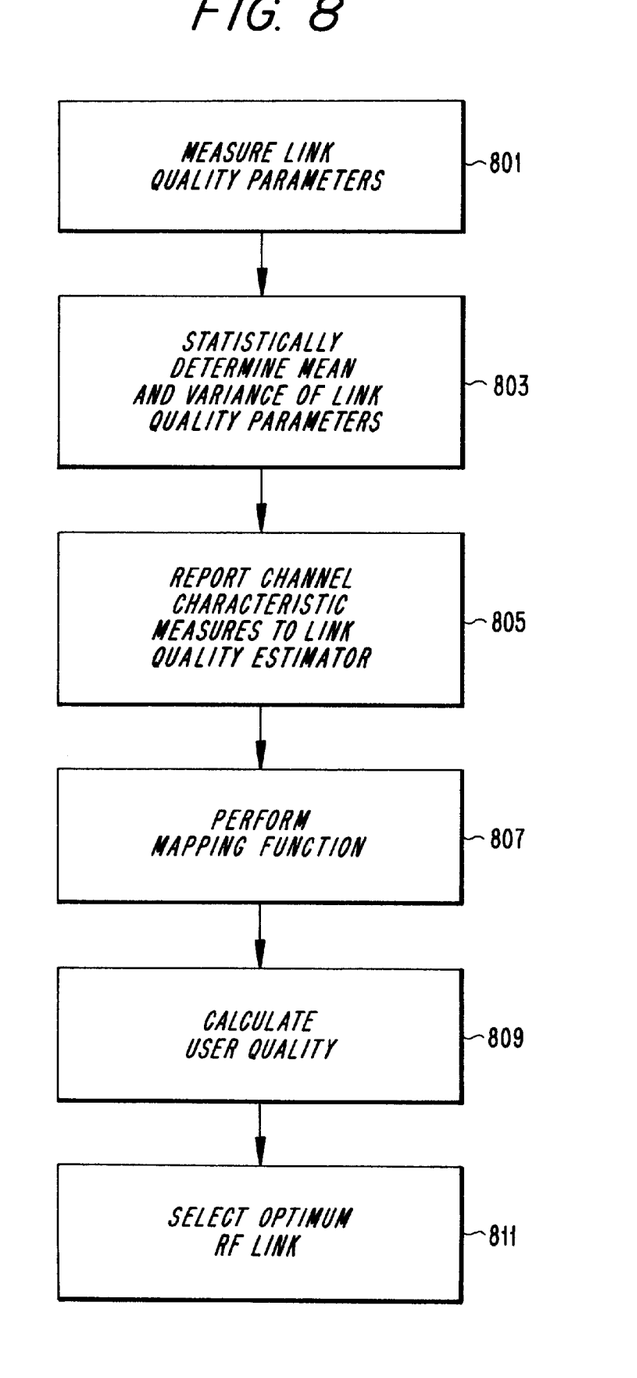
FIG. 8 is a flow chart of a link selection method according to an exemplary embodiment of the invention.

Referring to FIG. 8, a flow chart of a method for selecting a combination of modulation and channel coding schemes on an RF link according to an exemplary embodiment of the present invention is shown. In this exemplary embodiment, it is assumed that system 10 provides a non-transparent data service, for example, a packet data service under GPRS, in which data blocks, the smallest retransmittable units, are transmitted and erroneously received blocks are re-transmitted according to an Automatic Repeat Request (ARQ) scheme.

The selection method starts by measuring link quality parameters of an RF link at a receiver that may be in the mobile station 12 or a BTS 20, block 801. If more than one RF links are available, the selection method may measure link quality parameters of all available links as well. Examples of link quality parameter measurements include C/I ratio, received signal strength, time dispersion on burst level, and raw BER on block level. The measurements are processed to determine the distribution of the channel characteristic measures. For example, the distribution of the channel characteristic measures may be calculated statically in terms of mean values and variances of link quality parameters, block 803. The processed measurement results are reported to a link quality estimator, block 805.

In a preferred embodiment, the link quality estimator performs a mapping function fi, which maps the channel characteristic measures with estimated user quality values of each one of the supported combinations of modulation and channel coding schemes i, block 807. For example, mapping function fi calculates the mean value and variance of raw $BER_i$ based on measurement results, and then, based on the mean and variance value estimates $BLER_i$. The mapping functions may be implemented using a table that is initially constructed based on empirical results, such as simulation results, or experimental results, such as laboratory results, of the various combinations of modulation and channel coding schemes. Alternatively, the table may include results tuned based on actual measurements during the normal operation of the system 10.

In this exemplary embodiment, BLER estimates are used for calculating user quality values in terms of data throughputs $S_i$ for each one of the combinations of modulation and coding schemes, block 809. The user quality values are used for selecting an optimum combination of modulation and channel coding schemes on an RF link by comparing the data throughputs $S_i$, block 811. If the data throughput of a new combination, other than the one currently used is significantly higher, a link adaptation procedure is initiated to switch to the new combination.

For selecting the combination of modulation and channel coding scheme on an uplink RF link, the present invention performs all of the above specified steps at the RBS 22. For selecting the combination of modulation and channel coding scheme on a downlink RF link, the mobile station 12 performs the steps of measuring link quality parameters and calculating mean values and variances and reporting the channel characteristic measures to the RBS 22. The RBS 22 then performs the link quality estimation function and decides whether a new combination of modulation and channel coding schemes on an RF link should be selected or not.

Figure 9:
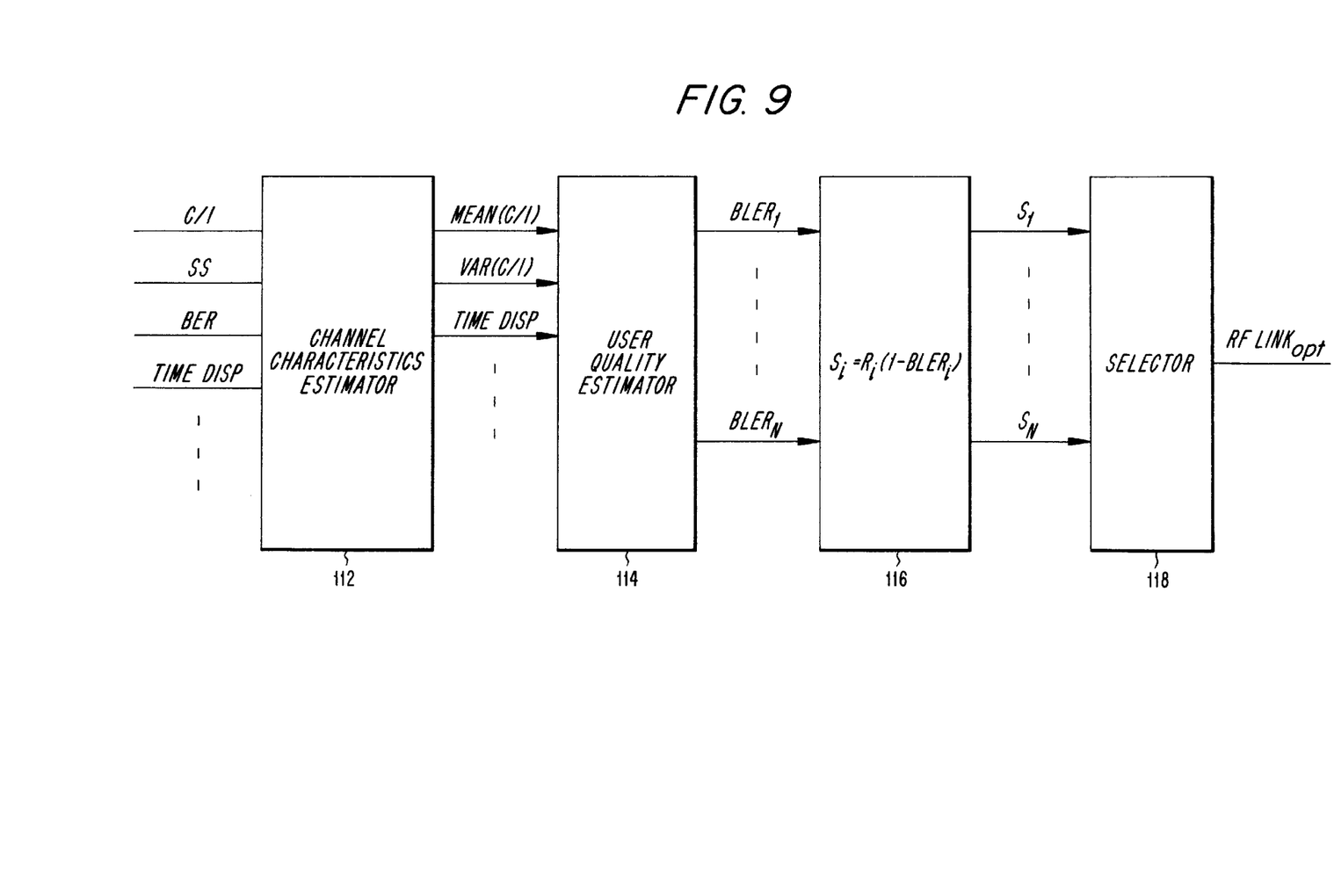
FIG. 9. is a block diagram of the selection method of FIG. 8.

FIG. 9 shows an exemplary block diagram of a means for estimating data throughput for N combinations of modulation and coding schemes. A channel characteristic estimator block 112 receives the link quality parameter measurements, e.g. C/I ratio, received signal strength, raw BER, and time dispersion parameter. Based on the measured link quality parameters, the channel characteristic estimator block 112 provides their mean values and variances. A user quality value estimator block 114, which operates based on previously obtained statistical link performance results or actual system measurements, provides estimate of $BLER_1$ through $BLER_N$. Based on nominal data bit rates $R_i$, a converter block 116 converts estimates of $BLER_1$ through $BLER_N$ to estimates of $S_1$ through $S_N$ by using Equation (1):

$$S_i = R_i(1 - BLER_i). \qquad (1)$$

Based on the data throughputs $S_i$, a selector block 118 selects an optimum combination of modulation and channel coding schemes on an RF link.

According to another aspect of the invention, a power control scheme is used in combination with the above described link selection method. Assuming that a transmitter has a power dynamic range between $P_{min}$ and $P_{max}$, this aspect of the invention selects an optimum power level, $P_{opt} \in [P_{min}, P_{max}]$, for each combination of modulation and channel coding schemes. The optimal power is based on a C/I target ($C/I_{des}$) for each combination, which may be based on a target user quality value, such as BLER target ($BLER_{des}$).

Figure 10:
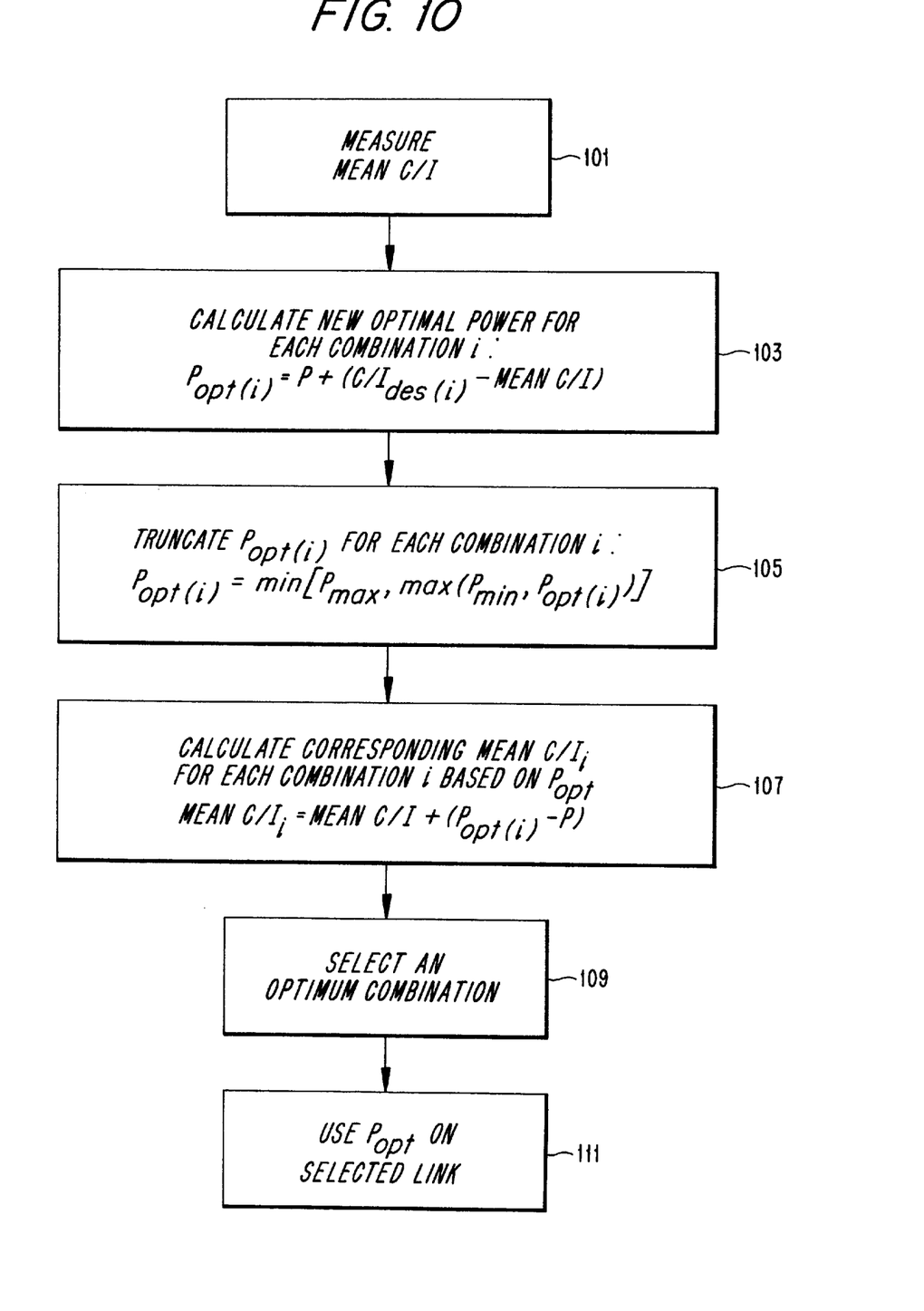
FIG. 10 is a flow chart of a power selection scheme according to another aspect of the invention.

Referring to FIG. 10, a flow chart of the power control scheme of this aspect of the invention is shown. The system 10 measures the mean value of C/I ratio (or other link quality parameters), for example using the measure obtained from step 803 of FIG. 8, block 101. Based on the mean C/I ratio, the system 10 calculates an optimal power Popt using Equation (2):

$$P_{opt(i)} = P + (C/I_{des(i)} - \text{mean } C/I), \qquad (2)$$

where P is transmit power at a time t and $C/I_{des\ (i)}$ ratio is a target C/I ratio for achieving a desired user quality value for a combination of modulation and channel coding schemes i, block 103. For example, $C/I_{des\ (i)}$ ratio may be a ratio that provides the target $BLER_{des\ (i)}$ for different combinations of modulation and channel coding schemes. Then, the optimal power $P_{opt}$ is truncated for each combination of modulation and channel coding scheme using Equation (3):

$$P_{opt(i)} = \min[P_{max}, \max(P_{min}, P_{opt(i)})]. \qquad (3)$$

The truncation step, block 105, allows for selection of a combination of modulation and channel coding scheme that provides the best user quality value, provided that the transmitter can produce the selected $P_{opt}$ without exceeding its $P_{max}$. If the calculated $P_{opt}$ is higher than the $P_{max}$, the system 10 sets the power of the transmitter at $P_{max}$. On the other hand, if the calculated $P_{opt}$ is less than the $P_{min}$, the system 10 sets the power of the transmitter at $P_{min}$. Then, for all combinations of modulation and channel coding schemes, the system 10 calculates, block 107, the mean $C/I_i$ ratio using Equation 4:

$$\text{mean } C/I_i = \text{mean } C/I + (P_{opt(i)} - P). \qquad (4)$$

This step estimates a corresponding mean $C/I_i$ for each combination of modulation and channel coding scheme by taking into account the dynamic range of the transmit power between $P_{max}$ and $P_{min}$. Once an optimum combination of modulation and channel coding schemes is selected, using for example, the steps described in blocks 805–811, the system 10 transmits on a selected RF link using the optimum combination at the optimal power $P_{opt}$, blocks 109 and 11.

Figure 11:
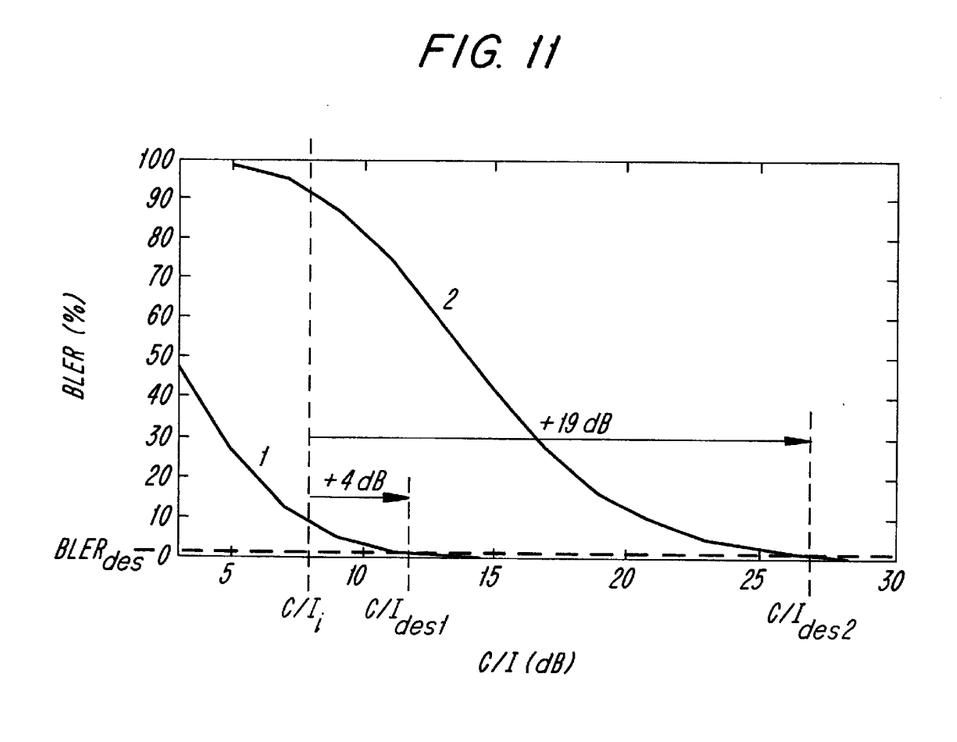
FIG. 11 is a graph of link performances of two combinations of channel coding and modulation schemes.

Referring to FIG. 11, a graph of link performances of two combinations of modulation and channel coding schemes is shown to describe an exemplary power control scheme according to the above described aspect of the invention. At a given time t, the transmit power of the transmitter, which, for example, has a dynamic range between $P_{min}=5$ dBm and $P_{max}=33$ dBm, is assumed to be at $P_t=20$ dBm. The measured $C/I_t$ ratio is assumed to be 8 dB. The target $C/I_{des}$ ratio is determined that gives a desired user quality. For example, $C/I_{des}$ ratio is 12 dB for the first combination (shown with Graph 1), and it is 27 dB for the second combination (shown with Graph 2). In order to achieve the $C/I_{des}$ ratio for the first and second combinations, the transmit power must be increased by 4 dB and 19 dB, respectively. Hence, for the first combination, $P_{opt}$ is equal to 24 dBm, and for the second combination $P_{opt}$ is 39 dbm, which is beyond $P_{max}$. In this case, the system 10 sets the transmit power to $P_{max}$ of 33 dBm and calculates the C/I ratio according to Equation (4). Based on the measured C/I ratio at $P_{max}$, a link providing the best user quality value is selected.

From the foregoing it would be appreciated that the present invention significantly facilitates RF link selection process in systems that supports multiple modulation and coding schemes. By statistically characterizing RF links in terms of distribution and variances of link quality parameters, the present invention provides a more effective link selection process. In this way, the present invention improves communication quality of systems that support multiple combinations of modulation and coding schemes.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. In a communication system, a method for selecting a combination of modulation and channel coding scheme from a plurality of combinations of modulation and channel coding schemes comprising the steps of:
    measuring at least one link quality parameter of an RF link;
    calculating at least one channel characteristic measure based on the measured at least one link quality parameter;
    estimating user quality values for each one of the combinations of modulation and channel coding schemes based on the calculated channel characteristic measure; and
    selecting a combination of modulation and channel coding schemes on an RF link that provides the best user quality value.

2. The method of claim 1, wherein the at least one link quality parameter is selected from one of a C/I ratio, BER, received signal strength, or time dispersion.

3. The method of claim 1, wherein the step of calculating the at least one channel characteristic measure includes the step of calculating a variance of the at least one measured link quality parameter.

4. The method of claim 3, wherein the step of calculating the at least one channel characteristic measure includes the step of calculating a mean value of the at least one measured link quality parameter.

5. The method of claim 1, wherein the step of estimating user quality values includes the step of mapping the at least one calculated channel characteristic measure with estimated user quality values of supported combinations of modulation and channel coding schemes.

6. The method of claim 1, wherein the user quality values are estimated using simulation results or laboratory results.

7. The method of claim 1, wherein the user quality values are estimated using results derived during normal operation of the communication system.

8. The method of claim 1, wherein the user quality values include a user data throughput.

9. The method of claim 8, wherein the step of estimating user quality values includes the step of estimating block error rates.

10. The method of claim 9, wherein the step of estimating user quality values includes the step of computing estimates of the user data throughput based on the estimated block error rates and nominal bit rates.

11. The method of claim 1, wherein the user quality values include speech quality values.

12. The method of claim 11, wherein said step of estimating user quality values includes the step of estimating the speech quality values originating from the use of different speech coding schemes.

13. The method of claim 1 further including the step of determining an optimal transmit power for each combination of modulation and channel coding schemes based on the at least one measured link quality parameter, wherein the optimal transmit power is limited by a dynamic range of a power transmitter.

14. The method of claim 13 further including the step of transmitting on the RF link at the optimal transmit power.

15. In a communication system, a method for selecting a combination of modulation and channel coding schemes from a plurality of combinations of modulation and channel coding schemes comprising the steps of:
    communicating data using a non-transparent service over an RF link;
    measuring at least one link quality parameter of the RF link;
    calculating at least one channel characteristic measure based on the at least one measured link quality parameter;
    estimating user data throughput for each combination of modulation and channel coding schemes based on the calculated channel characteristic; and
    selecting a combination of modulation and channel coding schemes of the RF link from the plurality of combinations of modulation and channel coding schemes that provides the best user data throughput.

16. The method of claim 15, wherein the at least one link quality parameter is selected from one of a C/I ratio, BER, received signal strength, or time dispersion.

17. The method of claim 15, wherein the step of calculating the at least one channel characteristic measure includes the step of calculating a variance of the measured at least one link quality parameter.

18. The method of claim 17, wherein the step of calculating the at least one channel characteristic measure includes the step of calculating a mean value of the at least one measured link quality parameter.

19. The method of claim 15, wherein the step of estimating user quality values includes the step of mapping the calculated channel characteristic measure with estimated user data throughput of supported combinations of modulation and channel coding schemes.

20. The method of claim 15, wherein the user data throughput is estimated using simulation results or laboratory results.

21. The method of claim 15, wherein the user data throughput is estimated using results derived during normal operation of the communication system.

22. The method of claim 15, wherein said step of estimating user data throughput includes the step of estimating block error rates and computing user data throughput based on the estimated block error rates and nominal bit rates.

23. The method of claim 15 further including the step of determining an optimal transmit power for each combination of modulation and channel coding schemes based on the measured link quality parameter and, wherein the optimal transmit power is limited by a dynamic range of a power transmitter.

24. The method of claim 23 further including the step of transmitting on the RF link at the optimal transmit power.

25. A communication system that communicates over RF links that support different combinations of modulation and channel coding schemes comprising:
   means for measuring at least one link quality parameter of an RF link;
   means for calculating at least one channel characteristic measure based on the measured at least one link quality parameter;
   means for estimating user quality values based on the calculated channel characteristic and the corresponding combinations of the modulation and channel coding schemes; and
   means for selecting a combination of modulation and channel coding schemes on an RF link that provides the best user quality value.

26. The communication system of claim 25, wherein the at least one link quality parameter is selected from one of a C/I ratio, BER, received signal strength, or time dispersion.

27. The communication system of claim 25, wherein the means for calculating the at least one channel characteristic measure calculates a variance of the measured at least one link quality parameter.

28. The communication system of claim 27, wherein the means for calculating the at least one channel characteristic measure calculates a mean value of the measured at least one link quality parameter.

29. The communication system of claim 25, wherein the means for estimating user quality values includes means for mapping the at least one calculated channel characteristic measure with the supported combinations of modulation and channel coding schemes.

30. The communication system of claim 25, wherein the user quality values are estimated using simulation results.

31. The communication system of claim 25, wherein the user quality values are estimated using results derived during normal operation of the communication system.

32. The communication system of claim 25, wherein the user quality values include a user data throughput.

33. The communication system of claim 25, wherein the means for estimating user quality values estimates block error rates.

34. The communication system of claim 25, wherein the means for estimating user quality values computes estimates of the user data throughput based on the estimated block error rates and nominal bit rates.

35. The communication system of claim 25, wherein the user quality values include speech quality values.

36. The communication system of claim 35, wherein the means for estimating user quality values estimates the speech quality values originating from the use of different speech coding schemes.

37. The communication system of claim 35 further including a power transmitter for transmitting on the RF link and means for determining an optimal transmit power for each combination of modulation and channel coding schemes based on the measured link quality parameter, wherein the optimal transmit power is limited by a dynamic range of the power transmitter.

38. In a communication system that provides for communication between a mobile station and a base station over uplink and downlink RF links, a method for selecting a combination of modulation and channel coding schemes from a plurality of combinations of modulation and channel coding schemes comprising the steps of:
   measuring at least one link quality parameter of an RF link at the base station;
   calculating at least one channel characteristic measure based on the measured link quality parameter at the base station;
   estimating user quality values for each one of the combinations of modulation and channel coding schemes based on the calculated channel characteristic and the corresponding combinations of the modulation and channel coding scheme supported at the base station; and
   selecting a combination of modulation and channel coding schemes on the RF link that provides the best user quality value.

39. In a communication system that provides for communication between a mobile station and a base station over uplink and downlink RF links, a method for selecting a combination of modulation and channel coding schemes from a plurality of combinations of modulation and channel coding schemes comprising the steps of:
   measuring at least one link quality parameter of an RF link at the mobile station;
   calculating at least one channel characteristic measure based on the at least one measured link quality parameter at the mobile station;
   reporting the calculated channel characteristic measure to the base station;
   estimating user quality values for each one of the combinations of modulation and channel coding schemes based on the calculated channel characteristic and the corresponding combinations of the modulation and channel coding scheme supported at the base station; and
   selecting a combination of modulation and channel coding schemes on the RF link that provides the best user quality value.

40. The method of claim 1, wherein the step of selecting a combination of modulation and channel coding schemes is performed during idle states or wait states.

41. In a communication system that provides for communication between a mobile station and a base station over uplink and downlink RF links, a method for selecting a combination of modulation and channel coding schemes from a plurality of combinations of modulation and channel coding schemes comprising the steps of:

measuring at least one link quality parameter of an RF link at the mobile station;

calculating at least one channel characteristic measure based on the at least one measured link quality parameter at the mobile station;

estimating user quality values for each one of the combinations of modulation and channel coding schemes based on the calculated channel characteristic and the corresponding combinations of the modulation and channel coding scheme supported at the base station; and     selecting a combination of modulation and channel coding schemes on the RF link that provides the best user quality value.

* * * * *